No. 646,354. Patented Mar. 27, 1900.
A. W. BUEL.
APPARATUS FOR TUNNELING.
(Application filed Feb. 2, 1898.)
(No Model.) 3 Sheets—Sheet 1.
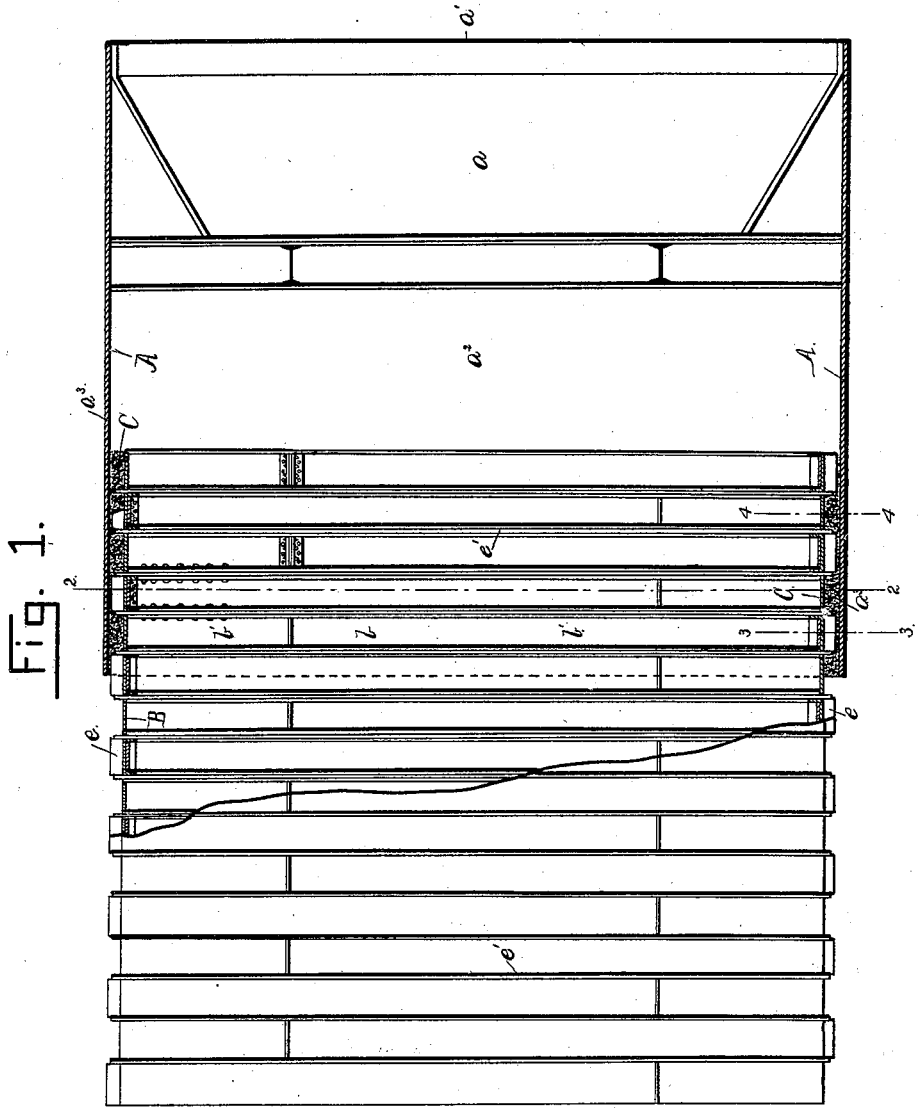

No. 646,354. Patented Mar. 27, 1900.
A. W. BUEL.
APPARATUS FOR TUNNELING.
(Application filed Feb. 2, 1898.)
(No Model.) 3 Sheets—Sheet 2.
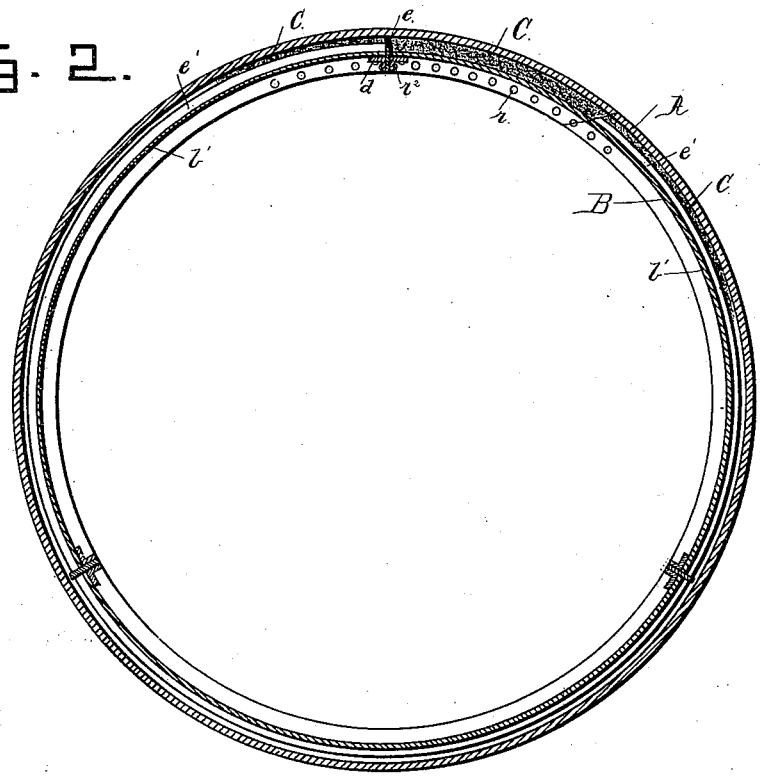
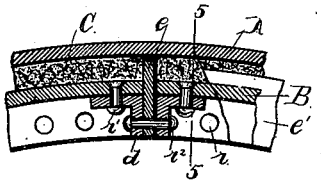
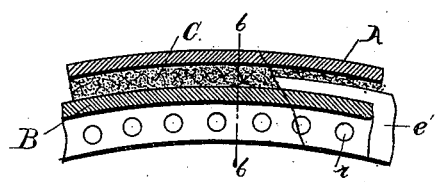
WITNESS
Woodville Flemming
Wm Paschal Langevin
INVENTOR
Albert W. Buel
J. R. Littell
his ATTORNEY
THE NORRIS PETERS CO., PHOTO-LITHO., WASHINGTON, D. C.

No. 646,354. Patented Mar. 27, 1900.
A. W. BUEL.
APPARATUS FOR TUNNELING.
(Application filed Feb. 2, 1898.)
(No Model.) 3 Sheets—Sheet 3.
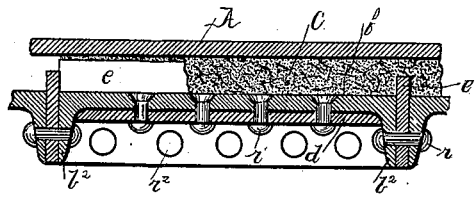
Fig. 5.
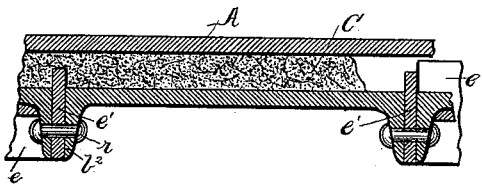
Fig. 6.
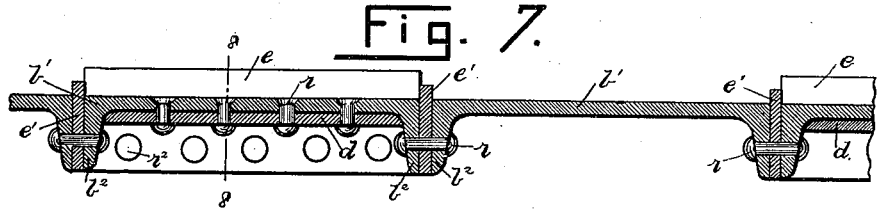
Fig. 7.
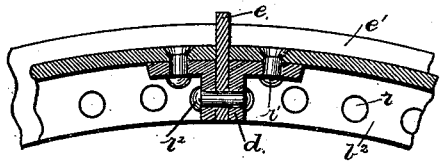
Fig. 8.
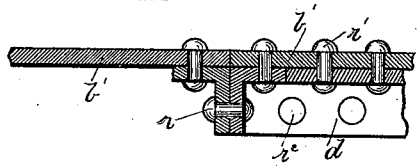
Fig. 9.
Fig. 10.
Fig. 11.
WITNESS
Woodville Fleming
W. Pascha Langevin
INVENTOR
Albert W. Buel
By J. R. Littell
his ATTORNEY

UNITED STATES PATENT OFFICE.

ALBERT W. BUEL, OF NEW YORK, N. Y.

APPARATUS FOR TUNNELING.

SPECIFICATION forming part of Letters Patent No. 646,354, dated March 27, 1900.

Application filed February 2, 1898. Serial No. 668,792. (No model.)

*To all whom it may concern:*

Be it known that I, ALBERT W. BUEL, a citizen of the United States, residing at New York, in the county of New York and State of New York, have invented certain new and useful Improvements in Apparatus for Tunneling; and I do hereby declare that the following is a full, clear, and exact description of the invention, which will enable others skilled in the art to which it appertains to make and use the same.

This invention relates to apparatus for tunneling, and has particular relation to the construction of tunnels beneath river-beds or through water-bearing strata and to that class of tunneling apparatus which comprises a shield operating upon and with relation to a casing and adapted to be advanced upon the casing.

The object of my invention is to provide an improved apparatus by which a tunnel can be effectively constructed at a materially-less depth with relation to the river-bed than has heretofore been considered necessary or virtually constructed in a trench in the river-bed, whereby the construction will be facilitated and the cost will be greatly cheapened.

In the drawings, Figure 1 is a longitudinal sectional view of the tunnel-shield and a portion of the casing, illustrating my invention. Fig. 2 is a transverse sectional view taken on the line 2 2, Fig. 1, the annular rings being partly broken away to show the packing in rear thereof. Fig. 3 is a detail sectional view, on a transverse plane, taken on the line 3 3, Fig. 1, the annular rings being partly broken away to show the packing in rear thereof. Fig. 4 is a detail sectional view, on a transverse plane, taken on the line 4 4, Fig. 1, the annular rings being partly broken away to show the packing in rear thereof. Fig. 5 is a detail sectional view, on a longitudinal plane, taken on the line 5 5, Fig. 3. Fig. 6 is a detail sectional view, on a longitudinal sectional plane, taken on the line 6 6, Fig. 4. Fig. 7 is a detail longitudinal sectional view of the casing. Fig. 8 is a detail transverse sectional view of the casing, taken on the line 8 8, Fig. 7. Fig. 9 is a detail sectional view illustrating a modification. Fig. 10 is a longitudinal vertical sectional view showing a trench in the river-bed and the tunnel in course of construction therein. Fig. 11 is a vertical transverse sectional view taken through Fig. 10.

Corresponding parts in all the figures are denoted by the same letters of reference.

In the construction of tunnels by the method and apparatus of this class as now generally employed it has heretofore been customary and necessary to bore or construct the tunnel at a considerable depth beneath the river-bed, so that the construction will be virtually through non-water-bearing strata and no danger of water entering the tunnel casing or shield will be incurred, or if the construction is through water-bearing strata a considerable depth of filling above the casing is necessary, whereby the air-pressure within the casing will be safely maintained. This deep construction entails comparatively great expense by reason of the necessarily-increased length of the tunnel, the longer or steeper grades rendered necessary at the approaches or termini, which entails increased cost of operation, and the fact that the construction is often through hard or impervious or rock strata, such as stone or the like. In thus tunneling, as just set forth, if the material or filling above the casing should give way or free water should be encountered it has been found necessary to fill in large quantities of earth or other material over the joint between the shield and casing and over the front of the shield to open up a heading, so that the said joint and heading will not be subject to the ingress of water and the air-pressure will be effectually maintained, which necessity causes considerable expense.

My invention and improvements are designed to overcome the disadvantages above set forth and provide apparatus for tunneling which will enable the effective construction of the tunnel through water-bearing strata or silt and sand and therefore in close proximity to the river-bed or actually in a trench in the river-bed, thereby materially lessening the expense of construction, rendering the same rapid and convenient, decreasing the essential length of the tunnel, and enabling shorter or better grades at the approaches or termini. The construction of a tunnel in this manner according to my improved apparatus will also avoid the occasion for excavating in hard or impervious rock strata or difficult material and the necessity for incurring the expense and labor of conveying such material from the heading and back through the tunnel-casing.

In carrying out my invention and improvements I primarily provide a packing between the shield and the casing, which packing will render the joint water-tight at all times during the construction of the tunnel and the advance of the shield.

I first preferably dredge a trench in the river-bed, as shown at T in the drawings, coincident with the line or plane of the proposed tunnel and then build the tunnel in said trench. After dredging the trench may partly or wholly fill with silt or sand and water, which will be washed in by natural action, and through this filled-in water-bearing strata in the trench the tunnel will be constructed. In thus constructing the tunnel the sections or channel-bars of the casing as they are placed in position within the shield are first provided upon their exterior face or periphery with a packing, which packing when the sections of the tunnel are finally bolted or secured in position will form a water-tight joint between the casing and the surrounding shield. This packing will extend over all the sections of the casing which are inclosed within the rear end of the shield and, as will be understood, will be continuously maintained to this extent at all times with relation to the advance of the shield upon the casing. In the construction of the tunnel through silt or sand and water, as thus enabled by my apparatus, said water-bearing strata may be simply forced away from the heading of the shield or pumped out and the transportation of heavy material or rock from the heading and back through the casing is practically avoided.

Referring to the drawings, A designates the shield, which is of the usual cylindrical construction and embodies a heading $a$, preferably provided with a forward cutting edge $a'$, similar to that which is usually provided upon a vertical pneumatic caisson. In rear of the heading $a$ the shield forms a working chamber $a^2$, in which the rams or other working devices are contained, and the rear end portion $a^3$ of the shield projects a considerable distance over the tunnel-casing B. The tunnel-casing is made up, as is customary, of transverse annular sections $b$, bolted together, each section being formed of a series of segmental plates $b'$, bolted together. The sections of the casing are built up within the rear end of the shield, and the latter is advanced upon the casing from time to time a distance proportionate to the sections of the casing which have been built up within it. All of the flanges and projections of the sections of the casing are interiorly arranged, so that ordinarily the casing presents a smooth exterior surface, and the casing is subsequently lined with brick or concrete or masonry in the completion of the tunnel.

C designates the packing comprised in my invention, which is arranged between the exterior surface of that portion of the casing which is inclosed by the rear end portion of the shield and the surrounding interior surface of the shield and forms a water or air tight joint between the casing and the shield. This packed joint is arranged to effectively maintain the proper air-pressure within the casing, though in view of the fact that the tunnel under my invention and improvements is constructed at a very much less depth than has heretofore been customary and the necessity for carrying the excavated material from the heading and back through the casing is practically unnecessary special maintenance of air-pressure within the casing or tunnel may not under some circumstances be necessary.

The packing C may consist of any suitable or adapted material; but I prefer to employ ordinary puddle-clay intermixed with a fibrous filling, as at $f$, which will retain and hold the body of the clay in compact condition. This fiber is of suitable length and may be formed of hemp or jute. In lieu of mixing a fiber throughout the body of the clay I may provide a fibrous packing by first wrapping strands of hemp or jute fiber around the exterior surface of the casing and then filling the clay or other body material upon the same, so that when the packing is compressed in position at the joint the fibrous base will serve to effectively retain the clay or body substance in place. Heretofore this class of tunnel-casings have generally been formed of cast-iron, each section $b$ being made up of a large number of the segmental plates $b'$; but my improvements are designed to enable and comprise the employment of rolled-steel plates in lieu of cast-iron, in carrying out which provision and construction I am enabled to employ a lesser number of segmental plates, three of such rolled-steel plates, each a one-third segment of a circle, as shown in the drawings, being by preference used under my invention and improvements in the construction of each casing-section $b$. These segmental rolled-steel plates $b'$ are formed from an ordinary flat steel plate having the usual flanges $b^2$ $b^2$ at its opposite end edges, the plate being bent by the usual process into the proper curvature or segmental form, with said flanges in transverse relation to the structure of the tunnel-casing. In the construction of the tunnel-casing from these plates the abutting flanges $b^2$ of the adjoining segmental plates $b'$ of the respective sections $b$ project interiorly with respect to the casing and are riveted or bolted together, as at $r$. At the adjoining edges of the segmental plates $b'$ which are comprised in the same casing-section $b$, which edges extend in a longitudinal plane with respect to the tunnel-casing, right-angle bars $d$ are secured to said plates by means of rivets $r'$, which are preferably countersunk at their outer end, which angle-bars $d$ form inwardlyprojecting longitudinally-arranged flanges similar to the integral transversely-extending flanges $b^2$, and these adjoining flanges $d$ are riveted or bolted together, as at $r^3$. The rivets $r'$, by which the angle-bars $d$ are secured to the plates $b'$, are "shop-driven" or fixed in position before the plates $b'$ are placed in position in the construction of the tunnel; but the rivets $r$ and $r^2$ are "field-rivets" and are driven or placed in position after the plates $b'$ are set in relative position in the construction of the casing-sections $b$. I am enabled, by means of the improved construction and arrangement as comprised in my invention, to drive these field-rivets by means of any suitable or adapted machine or apparatus centrally arranged within the casing and having its riveting device or arms movable for operation in a circle around the circumference of the casing at its interior and radially with respect to said central pivotal point.

It will be understood that the exterior surfaces of the plates $b'$ in my improved casing are smooth or unobstructed, all riveting flanges or projections being interiorly arranged, as herein described and shown.

I prefer to relatively arrange the adjoining casing-sections $b$ so that the longitudinally-extending joints between the respective plates $b'$ of said respective adjoining sections $b$ will be at different points or have an intermediate relation with respect to said adjoining casing-sections $b$, as shown in the drawings, whereby said longitudinally-arranged joints extend, respectively, only the width of the casing-sections $b$.

$e$ designates a bar which is arranged between the longitudinally-extending joint formed by the angle-bars $d$ upon the adjoining plates $b'$ of the respective sections $b$, which bar $e$ forms a packing or washer at said joint and is secured by the rivets $r^2$. These bars $e$ are preferably constructed of soft steel, and their outer edges project beyond the exterior surface of the casing, so that said projecting edges operate as guides for the shield A, which latter is preferably constructed of hard steel. The edges of the bars $e$ preferably project a distance which is slightly less than the width or thickness of the annular packing-space between the casing and shield, so that a suitable or desired degree of play between these guide-bars and the shield may be permitted. The bars $e$ are designed to so guide the shield in its advancing movement that it will not by lateral or angular variation affect or disarrange the packing C.

$e'$ designates an annular bar or ring, which is arranged between the transverse joints formed by the flanges $b^2$ at the edges of the plates $b'$ of the adjoining sections $b$. These annular bars $e'$ form packing-rings or washers extending in a transverse plane with respect to the tunnel-casing and are secured by the series of rivets $r$. Their outer ends project at the exterior surface of the casing and circumferentially with respect to the latter, their degree of projection being preferably not quite as far as that of the longitudinally-extending guide-bars $e$, so that they will not come into contact with or scrape on the shield. The office of these packing-rings $e'$ is to retain the packing C in position upon the respective casing-sections $b$, and they will also operate to prevent the packing C from "blowing out" under any conditions of air-pressure which may be used; but these packing-rings are not an essential element of my invention.

It will be noted that the connections between the segmental plates, as shown in the drawings, break joints at the respective pairs of packing-rings $e'$.

If desired, a suitable packing material may be employed to make a tight joint between the sections forming the casing, or such joints may be rendered air and water tight by calking.

In a practical application of the packing C between the casing and shield, which forms one of the main elements of my invention, as the respective casing-sections $b$ are formed within the shield from the segmental plates $b'$ said packing material may first be placed on the outer surface of the plates $b'$, and then said plates may be set in position against the shield, or said sections may first be placed in position and the packing calked in. As the sections $b$ of the casing are completed and the packing C is set into position the shield A is advanced forwardly in the progress of the work.

Heretofore in the construction of tunnel-casings from cast-iron plates said plates have necessarily been bolted together, it being impractical to rivet them. My invention and improvements comprise the employment of rolled-steel channels by which all joints can be riveted within the tunnel by hand or power, as desired, power-driven rivets being preferred. The channels may be what are known to the trade as "rolled" or "built" channels, either form being employed, as preferred.

It will be especially noted that my improvements enable the riveting of the segmental plates or channels forming the tunnel-casing inside the latter and radially, it being impractical to hold the rivets outside the tunnel-casing, the bolting of cast-iron plates having therefore heretofore been resorted to.

In Fig. 9 I have shown a modification in which the rivets are not countersunk at their outer ends, but project so that they are adapted to form the exterior guides for the shield.

The operation and advantages of my improved apparatus will be readily understood by those skilled in the art to which it appertains by reference to the foregoing description, in connection with the annexed drawings.

I do not desire to be understood as limiting myself to the details of construction and arrangement as herein shown and described, as various modifications may be manifestly employed in practical operation or in adapting my improvements to various conditions and purposes. I therefore reserve the right to all such variations and modifications as properly fall within the spirit and scope of my invention and the terms of the following claims.

Having thus described my invention, I claim and desire to secure by Letters Patent—

1. An improved apparatus for tunneling, comprising a casing, a shield surrounding said casing and adapted to be advanced thereon, a packing between said casing and the surrounding shield, and guide devices extending on a longitudinal plane and projecting within the packing-space between the casing and shield, substantially as and for the purpose set forth.

2. An improved apparatus for tunneling, comprising a casing, a shield surrounding the same and adapted to be advanced thereon, and guide devices extending on a longitudinal plane and projecting within the space between the casing and shield, substantially as and for the purpose set forth.

3. An improved apparatus for tunneling, comprising a casing, a shield surrounding the same and adapted to be advanced thereon, a packing spreading on the surface of the casing in the space between the casing and the surrounding shield, and guide devices extending on a longitudinal plane within the packing-space between the casing and shield and projecting directly into said surface packing to divide the same on a longitudinal plane and retain it against displacement on a transverse plane, substantially as set forth.

4. An improved apparatus for tunneling, comprising a casing, a shield surrounding the same and adapted to be advanced thereon, devices extending on a longitudinal plane and projecting in the space between the casing and shield, and devices arranged on a transverse plane with respect to the longitudinally-arranged devices and projecting in the space between the casing and shield, substantially as and for the purpose set forth.

5. An improved apparatus for tunneling, comprising a casing, a shield surrounding the same and adapted to be advanced thereon, a packing spreading on the surface of the casing in the space between the casing and shield, devices extending on a longitudinal plane and projecting in the space between the casing and shield, and devices arranged on a transverse plane with respect to the longitudinally-arranged devices and projecting in the space between the casing and shield, said devices on longitudinal and transverse planes intersecting or projecting directly into the surface packing to divide the same and retain it against displacement, substantially as set forth.

6. An improved apparatus for tunneling, comprising a casing, a shield surrounding the same and adapted to be advanced thereon, devices arranged on a transverse plane and projecting in the space between the casing and shield, and devices extending on a longitudinal plane and projecting in the space between the casing and shield, one of said sets of devices having a greater degree of projection than the other, substantially as and for the purpose set forth.

7. An improved apparatus for tunneling, comprising a casing, a shield surrounding the same and adapted to be advanced thereon, a packing spreading on the surface of the casing in the space between the casing and shield, devices arranged on a transverse plane and projecting in the space between the casing and shield, and devices extending on a longitudinal plane and projecting in the space between the casing and shield, said devices on longitudinal and transverse planes intersecting or projecting directly into the surface packing to divide the same and retain it against displacement, and the devices on a longitudinal plane having a greater degree of projection than the devices on a transverse plane so that the former serve as a guide for the shield while the latter prevent movement of the surface packing in a longitudinal plane during the movement of the shield on said guide devices, substantially as set forth.

8. An improved apparatus for tunneling, comprising a casing having exteriorly-projecting longitudinally-arranged guide-bars at its surface, and a shield surrounding said casing and adapted to be advanced thereon upon said guide-bars, substantially as and for the purpose set forth.

9. An improved apparatus for tunneling, comprising a casing having exteriorly-projecting longitudinally-arranged guide-bars at its surface, a shield surrounding said casing and adapted to be advanced thereon upon said guide-bars, and a packing arranged between the casing and shield, substantially as and for the purpose set forth.

10. An improved apparatus for tunneling, comprising a casing having exteriorly-projecting longitudinally-arranged guide-bars at its surface and provided with transversely-arranged bars or washers projecting at its surface, a shield surrounding said casing and adapted to be advanced thereon, and a packing arranged between the casing and shield and in the spaces between said longitudinally-arranged and transversely-arranged projecting bars, substantially as and for the purpose set forth.

11. An improved apparatus for tunneling, comprising a casing embodying annular sections formed of segmental plates, guide-bars arranged in longitudinally-extending position at the joints between said segmental plates and projecting at the surface of the casing, and a shield surrounding said casing and adapted to be advanced thereon upon said guide-bars, substantially as and for the purpose set forth.

12. An improved apparatus for tunneling, comprising a casing embodying annular sections formed of segmental plates, guide-bars longitudinally arranged at the joint between said segmental plates and projecting exteriorly from the casing, annular rings or washers arranged at the joints between said casing-sections and projecting exteriorly from the casing, a shield surrounding the casing and adapted to be advanced thereon, and a packing between said casing and shield, substantially as and for the purpose set forth.

13. An improved apparatus for tunneling, comprising a casing consisting of sections or channel-bars connected at joints, a shield surrounding the sections of the casing and adapted to be advanced upon the forward end of the casing, and a packing covering the whole surface area of all the sections of the casing which are inclosed by the surrounding shield and filling the entire space between the casing and the surrounding shield, whereby a complete or thorough water-tight-joint space and protection of the entire surface area of the sectional casing within the shield is at all times maintained with relation to the advance of the shield upon the casing, substantially as set forth.

14. An improved apparatus for tunneling, comprising a casing consisting of sections or channel-bars connected together, a shield surrounding the sections of the casing and adapted to be advanced upon the forward end of the casing, projections within the space between the casing-sections and the surrounding shield and distributed in position at different points with relation to the entire surface area of the portion of the sectional casing inclosed by the shield, and a packing covering the surface area of the sections of the casing which are inclosed by the surrounding shield and filling the space between the casing and the surrounding shield and intersecting the projections which are distributed in position throughout said intervening space, whereby a complete or thorough water-tight-joint space and protection of the entire surface area of the sectional casing within the shield is at all times maintained with relation to the advance of the shield upon the casing, substantially as set forth.

15. An improved apparatus for tunneling, comprising a casing consisting of sections or channel-bars connected at joints, a shield surrounding the sections of the casing and adapted to be advanced upon the forward end of the casing, and a packing consisting of clay and a medium connecting and uniting the parts or particles of the clay, said packing covering the whole surface area of all the sections of the casing which are inclosed by the surrounding shield and filling the entire space between the casing and the surrounding shield, whereby a complete or thorough water-tight-joint space and protection of the entire surface area of the sectional casing within the shield is at all times maintained with relation to the advance of the shield upon the casing, substantially as set forth.

16. An improved apparatus for tunneling, comprising a casing consisting of sections or channel-bars connected at joints, a shield surrounding the sections of the casing and adapted to be advanced upon the forward end of the casing, projections extending from the joints or seams of the casing-sections and within the space between the casing-sections and the surrounding shield, and a packing covering the surface area of the shield-inclosed sections of the casing in the spaces between said joint projections and filling the space between the casing and the surrounding shield, whereby a complete or thorough water-tight-joint space and protection of the entire surface area of the sectional casing within the shield is at all times maintained with relation to the advance of the shield upon the casing, substantially as set forth.

17. An improved apparatus for tunneling, comprising a casing consisting of sections or channel-bars connected together, a shield surrounding the sections of the casing and adapted to be advanced upon the forward end of the casing, projections within the space between the casing-sections and the surrounding shield, and a packing covering the whole surface area of the shield-inclosed casing-sections in the spaces between said projections and filling the space between said surface area of the casing and the surrounding shield, whereby a complete or thorough water-tight-joint space and protection of the entire surface area of the sectional casing within the shield is at all times maintained with relation to the advance of the shield upon the casing, substantially as set forth.

In testimony whereof I affix my signature in presence of two witnesses.

ALBERT W. BUEL.

Witnesses:
J. REED LITTELL,
L. D. SMITH.